United States Patent [19]

Choi

[11] Patent Number: 5,636,079
[45] Date of Patent: Jun. 3, 1997

[54] LOADING APPARATUS FOR TAPE RECORDERS AND HAVING A STRUCTURE FOR MOVING A SUB-CHASSIS

[75] Inventor: Do-young Choi, Suwon, Rep. of Korea

[73] Assignee: Samsung Electronics, Co., Ltd., Kyungki-do, Rep. of Korea

[21] Appl. No.: 570,693

[22] Filed: Dec. 11, 1995

[30] Foreign Application Priority Data

Jan. 14, 1995 [KR] Rep. of Korea .................... 95-588

[51] Int. Cl.$^6$ ................................................ G11B 15/61
[52] U.S. Cl. .................................... 360/85; 360/95
[58] Field of Search ............................. 360/85, 95, 96.5, 360/96.6

[56] References Cited

U.S. PATENT DOCUMENTS

| | | | |
|---|---|---|---|
| 5,021,899 | 6/1991 | Kotoda | 360/85 |
| 5,151,832 | 9/1992 | Nagasawa | 360/85 |
| 5,291,352 | 3/1994 | Nagasawa | 360/85 |
| 5,361,180 | 11/1994 | Yamabuchi et al. | 360/85 |
| 5,459,626 | 10/1995 | Lee et al. | 360/85 |
| 5,475,546 | 12/1995 | Choi | 360/85 |
| 5,485,324 | 1/1996 | Do et al. | 360/85 |
| 5,486,958 | 1/1996 | Choi et al. | 360/85 |

*Primary Examiner*—Jefferson Evans
*Attorney, Agent, or Firm*—Sughrue, Mion, Zinn, Macpeak & Seas

[57] ABSTRACT

A tape loading apparatus for a tape recorder having a structure for moving a sub-chassis of the tape recorder such as a compact camcorder. The loading apparatus for a tape recorder includes a pair of first links which are rotatably installed about a predetermined supporting point on a first chassis, and are movably connected to a second chassis by a predetermined distance, to thereby rotate by a predetermined angle according to the movement of the second chassis. An elastic member is provided which applies a retroactive force to the first links at a predetermined rotation position of the first links, by mutually connecting the first links while interposing the supporting point of the first links. Moreover, a pair of second links is provided for imparting moving forces to the pole bases according to the rotation of the first links by connecting the first links with the pole bases, respectively. The loading apparatus of the tape recorder reduces the number of the necessary components as well as a loss of a movement force. Since the various procedures are performed simultaneously, it takes a short time to load a magnetic tape. Further, deformation of the components due to the compression retroactive force and lowering of the precision does not occur.

4 Claims, 3 Drawing Sheets

LOADING APPARATUS FOR TAPE RECORDERS AND HAVING A STRUCTURE FOR MOVING A SUB-CHASSIS

BACKGROUND OF THE INVENTION

1. Field of the Invention

The present invention relates to a tape recorder and, more particularly, to a tape loading apparatus which can be adapted for a tape recorder having a structure for moving a sub-chassis of the tape recorder such as a compact camcorder.

2. Description of the Related Art

Generally, a loading procedure in a tape recorder having a structure in which the sub-chassis moves, is described below.

After a cassette tape is inserted into a sub-chassis, the sub-chassis moves by a predetermined distance. Then, the sub-chassis is kept at a standstill and a pair of pole bases draw out magnetic tape contained in a tape cassette to have the drawn-out magnetic tape contact a drum. In such a state, a cam or another mechanism applies a force to the pole bases to maintain the magnetic tape with a predetermined tension. In short, it is not until the process for moving the sub-chassis is completed that the process for contacting the magnetic tape with the drum is performed.

In the conventional tape recorder having the above-described loading structure, it takes too much time from insertion of the tape to loading completion. Also, a separate apparatus which pushes a pole base by a constant force is needed to provide a compression force for maintaining tension of the magnetic tape. Further, since the compression force pushing the pole base is provided from a motor, power consumption becomes large, and since a reacting force with respect to the compression force acts on the sub-chassis and the compression-related apparatus, a portion acted on by the force becomes twisted.

SUMMARY OF THE INVENTION

Therefore, to solve the above problem, it is an object of the present invention to provide a loading apparatus for a tape recorder having a small number of components, less power consumption, a short loading time of the tape, and an improved precision of the deck components.

To accomplish the above object of the present invention, there is provided a loading apparatus for a tape recorder having a first chassis on which a pair of pole bases are installed to load a magnetic tape to a head drum while moving along a predetermined path around the head drum, and a second chassis which receives a force of a loading motor and moves on the first chassis to move a cassette tape, the loading apparatus for a tape recorder comprising:

- a pair of first links which are rotatably installed about a predetermined supporting point on the first chassis, and are movably connected to the second chassis by a predetermined distance, to thereby rotate by a predetermined angle according to the movement of the second chassis;
- an elastic member which applies a retroactive force to the first links at a predetermined rotation position of the first links, by mutually connecting the first links while interposing the supporting point of the first links; and
- a pair of second links for providing moving forces to the pole bases according to the rotation of the first links by connecting the first links with the pole bases, respectively.

BRIEF DESCRIPTION OF THE DRAWINGS

The preferred embodiments are described with reference to the drawings, wherein.

DETAILED DESCRIPTION OF THE PREFERRED EMBODIMENT

A preferred embodiment of the present invention will be described below in more detail with reference to the accompanying drawings.

Figure 1A:
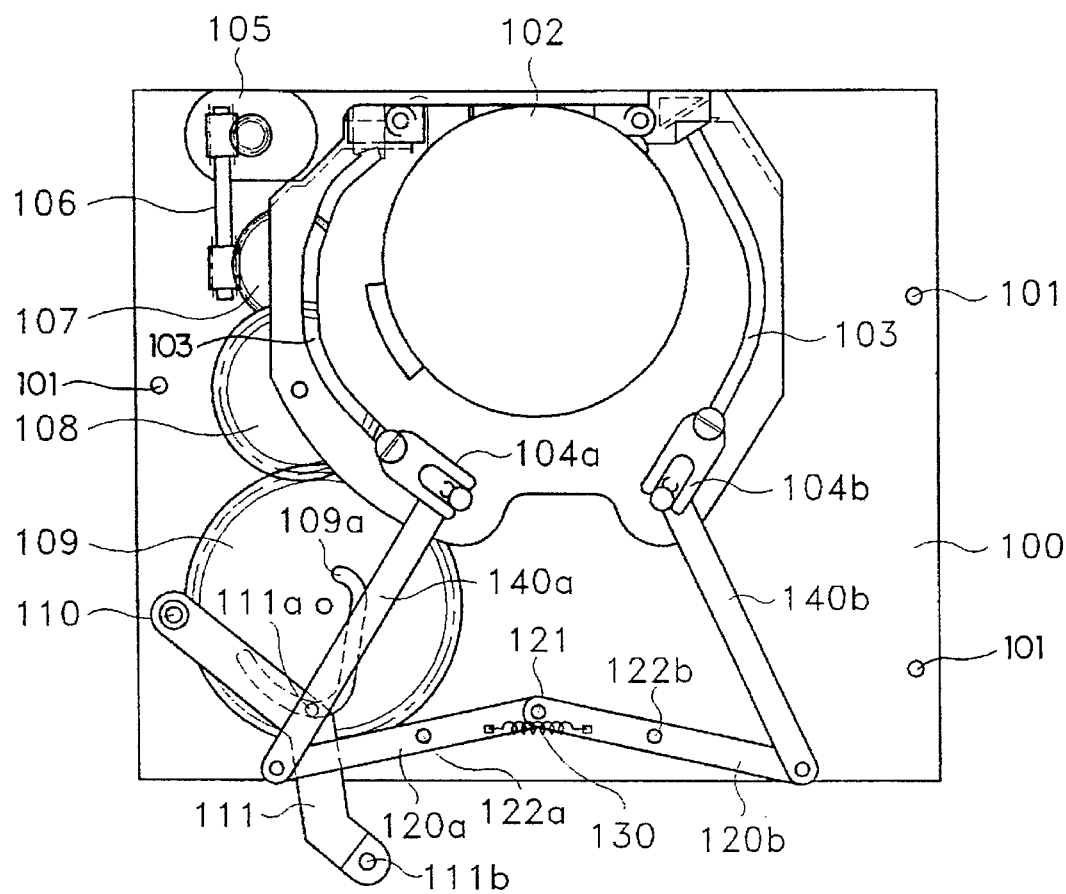
FIGS. 1A and 1B are views for explaining a structure of a loading apparatus of a tape recorder according to the present invention.
Figure 1B:
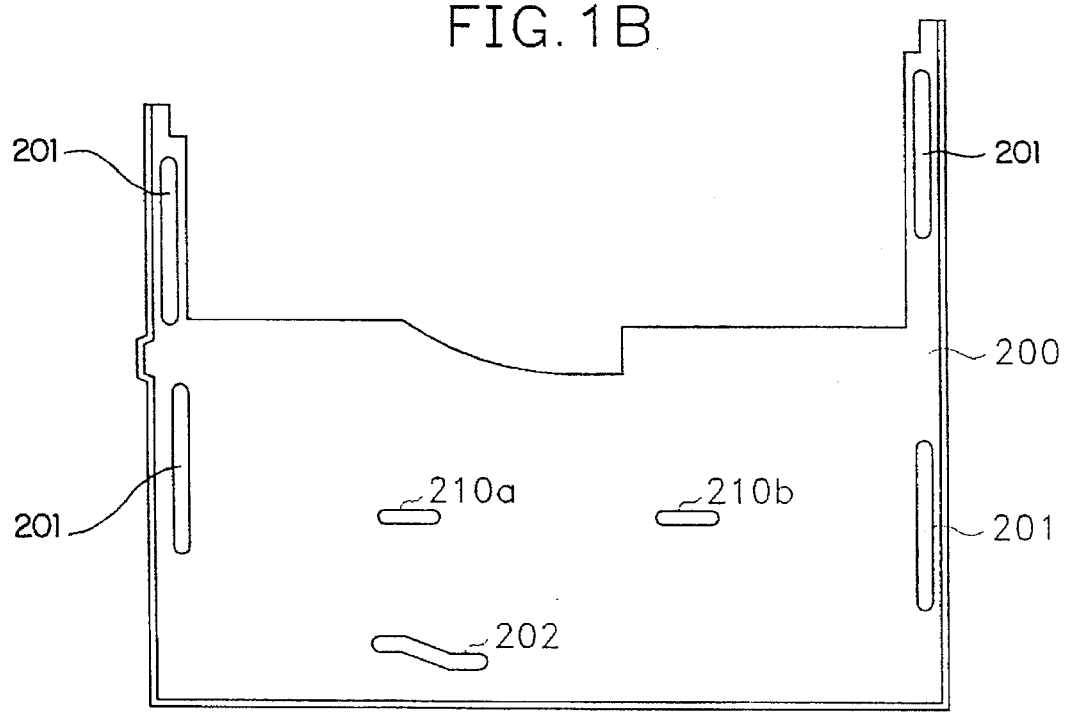

FIGS. 1A and 1B are views for explaining a structure of a loading apparatus of a tape recorder according to the present invention, in which FIG. 1A is a plan view of a main chassis and FIG. 1B is a plan view of a sub-chassis. As shown in FIG. 1A, a plurality of guide pins 101 are provided on the main chassis 100. The guide pins 101 guide the sub-chassis 200. A head drum 102 on which magnetic heads are installed is mounted on the main chassis 100. The pole base movement paths 103 are provided at the left and right sides of the head drum 102. A supply pole base 104a and a receiving pole base 104b are installed in the pole base movement paths 103, respectively. That is, the pole bases 104a and 104b can be moved along the pole base movement paths 103. A loading motor 105 for providing a loading force is provided at one side of the main chassis 100. A worm gear 106 is connected to the loading motor 105. A spur gear 107 is engaged with the worm gear 106. A mode switch gear 108 is engaged with the spur gear 107. A cam gear 109 is engaged with the mode switch gear 108. That is, the cam gear 109 can be rotated by the loading motor 105. A cam groove 109a of a predetermined path is formed on the cam gear 109.

A lever 111 which rotates with a center of rotation about a first hinge 110 is provided on the main chassis 100. A following piece 111a, which is inserted into the cam groove 109a and guided along the cam groove 109a, and a lever pin 111b, which is inserted into a first elongate hole 202 for providing a movement force to the sub-chassis 200, are installed on the lever 111.

A pair of first links 120a and 120b are rotatably installed on the main chassis 100 by a predetermined angle centered about a second hinge 121. Here, first links 120a and 120b may rotate centered at a separate hinge point. Link pins 122a and 122b, which are inserted into second elongate holes 210a and 210b for receiving a movement force of the sub-chassis 200, are installed on the first links 120a and 120b, respectively. The first links 120a and 120b are mutually connected by an elastic member 130 while interposing the second hinge 121. Rotatable second links 140a and 140b are connected to ends of the first links 120a and 120b, while a pair of pole bases 104a and 104b are connected to the other ends of the second links 140a and 140b, respectively.

As shown in FIG. 1B, a plurality of lengthwise elongate guide holes 201, into which are inserted the guide pins 101 of the main chassis 100 shown in FIG. 1A and guided by means thereof, are formed in the sub-chassis 200 along the peripheral portions. The first elongate hole 202 into which is inserted the lever pin 111b of the main chassis 100 and which receives a force of the loading motor 105, and the pair of second elongate holes 210a and 210b into which the link pins 122a and 122b installed on the first links 120a and 120b of the main chassis 100 are inserted, are formed on the sub-chassis 200 in parallel spaced from each other by a predetermined distance.

Figure 2A:
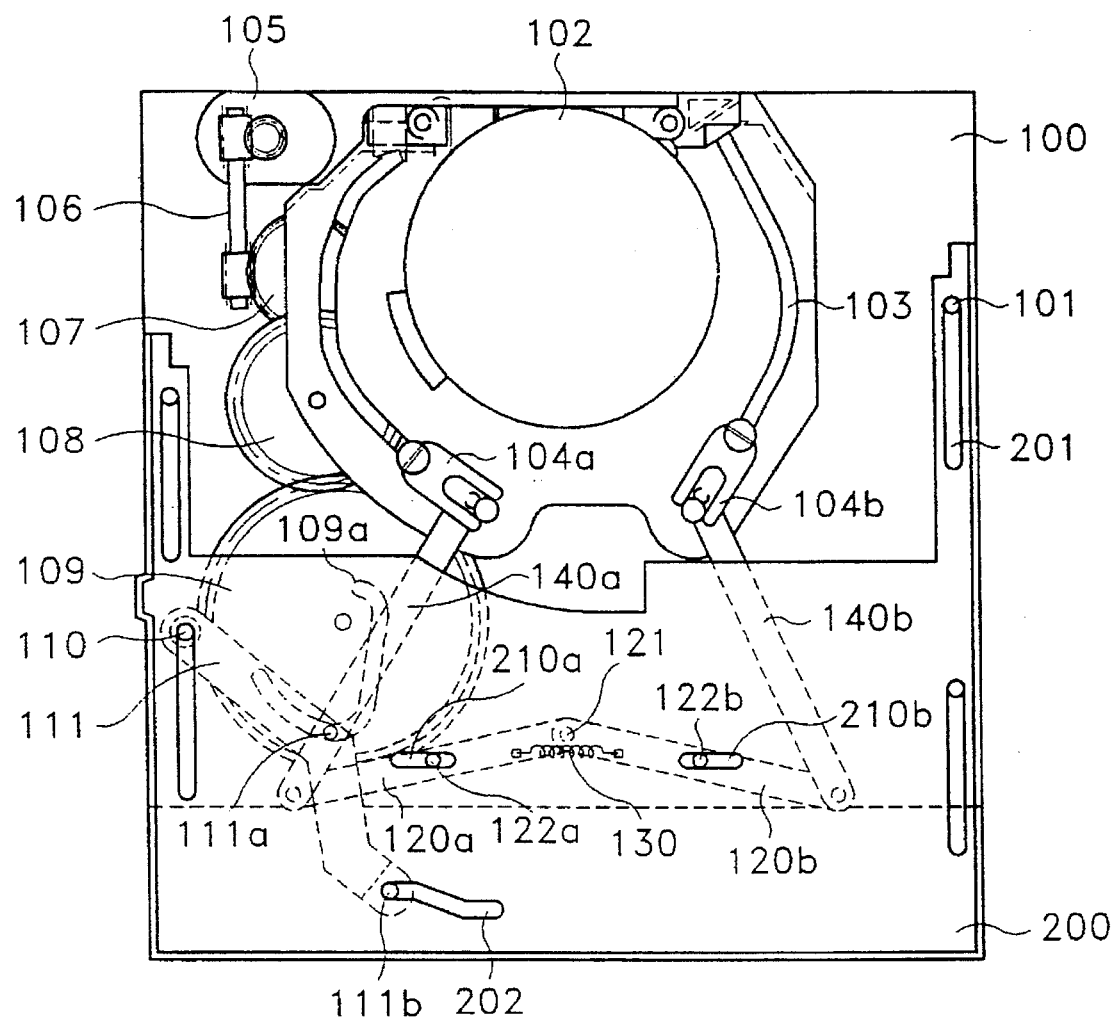
FIGS. 2A and 2B are plan views showing a connection state of a main chassis of FIG. 1A with a sub-chassis of FIG. 1B.
Figure 2B:
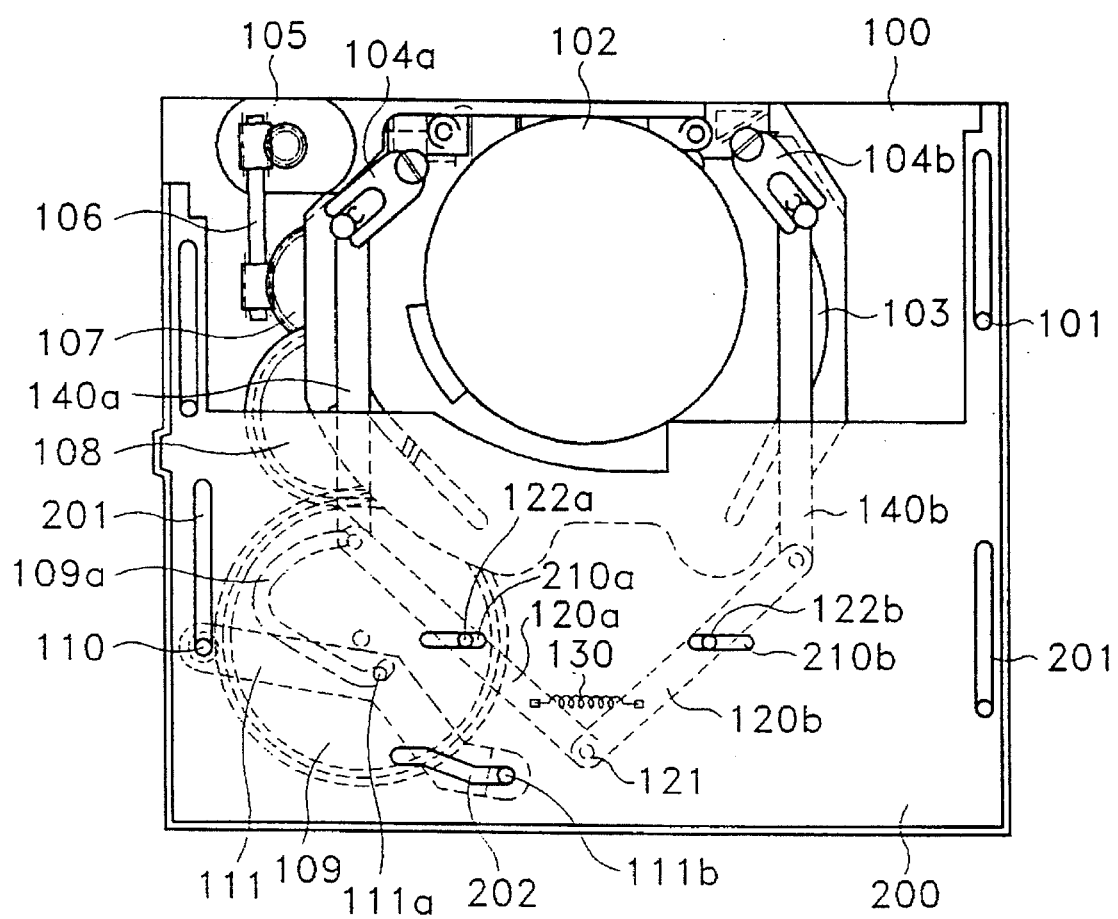

A state of connecting the main chassis and the sub-chassis is shown in FIGS. 2A and 2B. FIGS. 2A and 2B are plan views showing the connection state of a main chassis of FIG. 1A with a sub-chassis of FIG. 1B. An unloading state and a loading state are shown in FIGS. 2A and 2B, respectively. As shown in FIGS. 2A and 2B, the sub-chassis 200, on which elongate guide holes 201 are formed to be guided by the guide pins 101 installed on the main chassis 100, is positioned on main chassis 100, so as to move backwards and forwards. The first elongate hole 202 for receiving a movement force of the sub-chassis 200 and the pair of second elongate holes 210a and 210b for using the movement force of sub-chassis 200 for the loading of tape, are formed in parallel spaced from each other by a predetermined distance.

If the loading motor 105 is driven in the state where a cassette tape is inserted into a tape recorder having the above-described structure, the cam gear 109 rotates via various gears installed on main chassis 100. Accordingly, the following piece 111a of lever 111 is subject to receive a force to one direction by the cam groove 109a, and the lever 111 rotates about the first hinge 110. Then, the sub-chassis 200 is forwarded by the lever pin 111b which is inserted into first elongate hole 202 in the sub-chassis 200. If the sub-chassis 200 is forwarded, the first links 120a and 120b rotate by link pins 122a and 122b which are inserted into the second elongate holes 210a and 210b of the sub-chassis 200. First link 120a of the supply side rotates clockwise about the second hinge 121, while the first link 120b of the receiving side rotates counterclockwise about the second hinge 121. Accordingly, the second links 140a and 140b which are connected to the first links 120a and 120b push the pole bases 104a and 104b. The pole bases 104a and 104b are forwarded along the pole base movement paths 103. Here, the elastic member 130 pulls the first links 120a and 120b, in which a counterclockwise force acts on the first link 120a of the supply side and a clockwise force acts on the first link 120b of the receiving side, until the first links 120a and 120b are aligned in a single straight line. If the sub-chassis 200 is further forwarded at the state of alignment in a single straight line of the first links 120a and 120b, the elastic member 130 imparts a force on the first links 120a and 120b in the reverse direction to the present direction. That is, the elastic member 130 gives a clockwise force to the first link 120a of the supply side and a counterclockwise force to the first link 120b of the receiving side.

If a loading operation is completed via the above-described procedure, the loading mechanism takes on a state as shown in FIG. 2B. Also, the elastic member 130 imparts the clockwise force on the first link 120a of the supply side and imparts the counterclockwise force on the first link 120b of the receiving side. That is, the elastic member 130 pulls the first links 120a and 120b. Accordingly, the first links 120a and 120b push the second links 140a and 140b connected to the first links 120a and 120b. The second links 140a and 140b apply forces to the pole bases 104a and 104b. That is, a magnetic tape is pressed by an elastic force of the elastic member 130 to maintain a constant tension of the magnetic tape. In such a state, a retroactive force with respect to the pressure of the magnetic tape is transferred to the second hinge 121 of the main chassis 100 via the second links 140a and 140b and the first links 120a and 120b, and not to the other portions such as the sub-chassis 200.

As described above with reference to FIGS. 1A, 1B, 2A and 2B, the loading apparatus of the tape recorder according to the present invention does not require a separate compression mechanism, thereby reducing the number of the necessary components. Also, an elastic force of the elastic member is used to compress the magnetic tape and a movement force of the sub-chassis is used, thereby reducing a loss of a movement force. Since the various procedures are performed simultaneously, it takes a short time to load a magnetic tape. Further, since a retroactive force of a compression force of the magnetic tape is transferred to a hinge of a main chassis, the other portions such as the sub-chassis are not influenced by the retroactive force. Deformation of the component due to the compression retroactive force and lowering of the precision do not occur.

While only certain embodiments of the invention have been specifically described herein, it will be apparent that numerous modifications may be made thereto without departing from the spirit and scope of the invention.

What is claimed is:

1. A loading apparatus for a tape recorder having a first chassis on which a pair of pole bases are installed to load a magnetic tape to a head drum while moving along a predetermined path around the head drum, and a second chassis which receives a force of a loading motor and moves on the first chassis to move a cassette tape, said loading apparatus for a tape recorder comprising:

a pair of first links which are rotatably installed about a supporting point on said first chassis, and are movably connected to said second chassis at separate points, to thereby rotate by a predetermined angle according to the movement of the second chassis;

an elastic member which applies a retroactive force to the first links at a predetermined rotation position of said first links, by mutually connecting said first links while interposing the supporting point of said first links; and a pair of second links, connecting said first links with the pole bases, for providing moving forces to the pole bases according to the rotation of said first links.

2. The loading apparatus for a tape recorder according to claim 1, wherein the supporting point of said first links is located at an approximate mid-portion from left and right sides of said first chassis.

3. The loading apparatus for a tape recorder according to claim 2, wherein a plurality of elongate holes are formed in said second chassis, and a plurality of pins, which are inserted into said elongate holes, are formed in said first links, so that said first links are connected to said second chassis.

4. The loading apparatus for a tape recorder according to claim 1, wherein said elastic member provides a compression force to said magnetic tape via said first links, said second links, and said pole bases at a state where said tape recorder is loaded.

* * * * *